(12) United States Patent
Sunderberg et al.

(10) Patent No.: US 7,970,399 B2
(45) Date of Patent: Jun. 28, 2011

(54) METHOD AND ARRANGEMENT FOR IMPROVED INTER-RAT HANDOVER

(75) Inventors: Krister Sunderberg, Sollentuna (SE); Stefan Ström, Täby (SE); Walter Müller, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/593,306

(22) PCT Filed: Mar. 17, 2004

(86) PCT No.: PCT/SE2004/000395
§ 371 (c)(1),
(2), (4) Date: Sep. 18, 2006

(87) PCT Pub. No.: WO2005/089009
PCT Pub. Date: Sep. 22, 2005

(65) Prior Publication Data
US 2007/0213055 A1  Sep. 13, 2007

(51) Int. Cl.
*H04W 36/00* (2009.01)
*H04W 4/00* (2009.01)

(52) U.S. Cl. .......... 455/436; 455/435.2; 455/432.1; 455/434; 370/331; 370/332

(58) Field of Classification Search .......... 370/254–342; 455/436, 439, 450, 432.1, 435.2, 452.2, 453
See application file for complete search history.

(56) References Cited

U.S. PATENT DOCUMENTS

| | | | |
|---|---|---|---|
| 5,313,652 A * | 5/1994 | Rozenstrauch et al. | 455/15 |
| 2002/0077140 A1* | 6/2002 | Monogioudis et al. | 455/522 |
| 2002/0093922 A1 | 7/2002 | Grilli et al. | |
| 2002/0187784 A1* | 12/2002 | Tigerstedt et al. | 455/439 |
| 2003/0207687 A1 | 11/2003 | Svedevall et al. | |
| 2003/0207691 A1* | 11/2003 | Chen | 455/450 |
| 2003/0218995 A1* | 11/2003 | Kim et al. | 370/318 |
| 2004/0008647 A1* | 1/2004 | Hunkeler | 370/333 |
| 2004/0022217 A1* | 2/2004 | Korpela et al. | 370/335 |

(Continued)

FOREIGN PATENT DOCUMENTS

| | | |
|---|---|---|
| EP | 0 961 512 | 12/1999 |
| WO | 03/005759 | 1/2003 |

OTHER PUBLICATIONS

3rd Generation Partnership Project; Technical Specification Group Radio Access Network; Physical layer—Measurements (3G TS 25.215 version 3.1.0) Dec. 1999; Pertinent sections: 5.1.1 and 5.1.7.*

(Continued)

*Primary Examiner* — Kamran Afshar
*Assistant Examiner* — Kathy Wang-Hurst
(74) *Attorney, Agent, or Firm* — Nixon & Vanderhye, P.C.

(57) ABSTRACT

Method and arrangements for enabling improved handover of a user equipment (3) communicating in a first radio access network (1) utilizing a first radio access technology (RAT), where the user equipment (3) measures a first parameter and a second parameter for a plurality of neighboring cells (20) of at least a second radio access network (2) utilizing WCDMA, reports the measured parameters to a node (10) in the first network (1) and handover is initiated to one of the cells (20) in the second network (2) based on both of the reported first parameter and second parameters.

21 Claims, 4 Drawing Sheets

U.S. PATENT DOCUMENTS

| | | | |
|---|---|---|---|
| 2004/0082328 A1* | 4/2004 | Japenga et al. ............... | 455/436 |
| 2004/0109431 A1* | 6/2004 | Abrahamson et al. ........ | 370/342 |
| 2006/0111110 A1* | 5/2006 | Schwarz et al. .............. | 455/439 |
| 2007/0165537 A1* | 7/2007 | Magnusson et al. .......... | 370/254 |

OTHER PUBLICATIONS

International Search Report for PCT/SE2004/000395 dated Nov. 1, 2004.

3GPP TS 24.008 V5.10.0 (Dec. 2003) 3rd Generation Partnership Project; Technical Specification Group Core Network; Mobile radio interface Layer 3 specification; Core network protocols; Stage 3 (Release 5).

3GPP TS 04.18 V8.21.0 (Feb. 2004) 3rd Generation Partnership Project; Technical Specification Group GSM/EDGE Radio Access Network; Mobile radio interface layer 3 specification; Radio Resource Control Protocol (Release 1999).

* cited by examiner

METHOD AND ARRANGEMENT FOR IMPROVED INTER-RAT HANDOVER

This application is the US national phase of international application PCT/SE2004/000395 filed 17 Mar. 2004, which designated the U.S., the entire content of which is hereby incorporated by reference.

TECHNICAL FIELD

The invention relates to communication networks in general, and specifically to handover between different radio access technologies.

BACKGROUND

Throughout the world, third-generation mobile services are being introduced. As a consequence, a plurality of different radio access technologies (RAT) coexists, e.g. TDMA, WCDMA, CDMA2000, WLAN etc.

In order to enable almost seamless services for the end-users, third generation mobile terminals are equipped with so called dual RAT, e.g. both WCDMA (Wideband Code-Division Multiple Access) and GSM technology (Global System for Mobile communications) i.e. TDMA, whereby the mobile terminal is able to communicate with both RATs. Likewise, the mobile terminal and the radio access network have to be able to support handover between the two technologies.

Handover between networks utilizing different RAT require that a dual-mode user equipment or mobile terminal, while communicating over a first radio access network utilizing a first RAT, perform measurements on neighboring cells in a second radio access network utilizing a second RAT.

Depending on the type of network, either the mobile terminal itself decides when to change from one cell to another, or the decision is performed at a network node such as a base station controller in the first network. The later case suggests that the mobile terminal has to report some measured parameters to a base station.

During handover from a GSM network to a network utilizing WCDMA e.g. UTRAN, the mobile transmits a standardized measurement report to the base station controller of the GSM network. Consequently, the base station controller, based on the received measurement report, decides to which target UTRAN cell the handover will be effected.

Various problems are associated with such inter-RAT handovers, typically due to the inherent differences in the radio access technologies.

SUMMARY

A general object of the present technology is to provide an improved handover between different radio access technologies.

A further object is to provide a method for improved inter-RAT handover to radio access networks utilizing WCDMA.

Yet another object is to provide a method for stable handover performance during variations in traffic load.

The above mentioned objects and other objects are achieved with the present technology.

An aspect of the present technology is to enhance the UTRAN/WCDMA measurements in the Measurement result message sent from a multi-RAT mobile, so that both a first parameter e.g. the Ec/No value, and a second parameter e.g. the RSCP value, are included. The base station controller will then have the possibility to use both measures to make an optimal UTRAN handover decision. This will make the handover performance more optimized and stable during traffic load variations.

An advantage of this technology is that the handover to UTRAN decision will be optimized. The decision will be more independent of the traffic load situation, and the implementation can be made in such a way that the operator can select to trigger UTRAN handover based on Ec/No measurements, RSCP measurements, or both.

This technology improves the reporting from Mobile Stations/User Equipment sent to the BSC in GSM mode, by including both quality and Signal strength measurements of WCDMA/UTRAN neighbors.

Advantages of the present technology include:
Improved measurement report
Stable handover
Optimized handover decision
Prevented ping-pong handover

BRIEF DESCRIPTION OF THE DRAWINGS

The invention, together with further objects and advantages thereof, may best be understood by making reference to the following description taken together with the accompanying drawings, in which.

DETAILED DESCRIPTION

Frequently mentioned abbreviations are listed below:

| | |
|---|---|
| Ec/No | Chip Energy divided by Noise |
| HO | HandOver |
| IRAT | Inter Radio Access Technology |
| MS | Mobile Station |
| RSCP | Received Signal strength per chip |
| UE | User Equipment |
| RXQUAL | Received Signal Quality |
| RXLEV | Received Signal Level |
| CPICH | Common Pilot Channel |

In order to fully appreciate the merits of the present technology a more in-depth identification and description of the problems with prior art will be described below.

Figure 1:
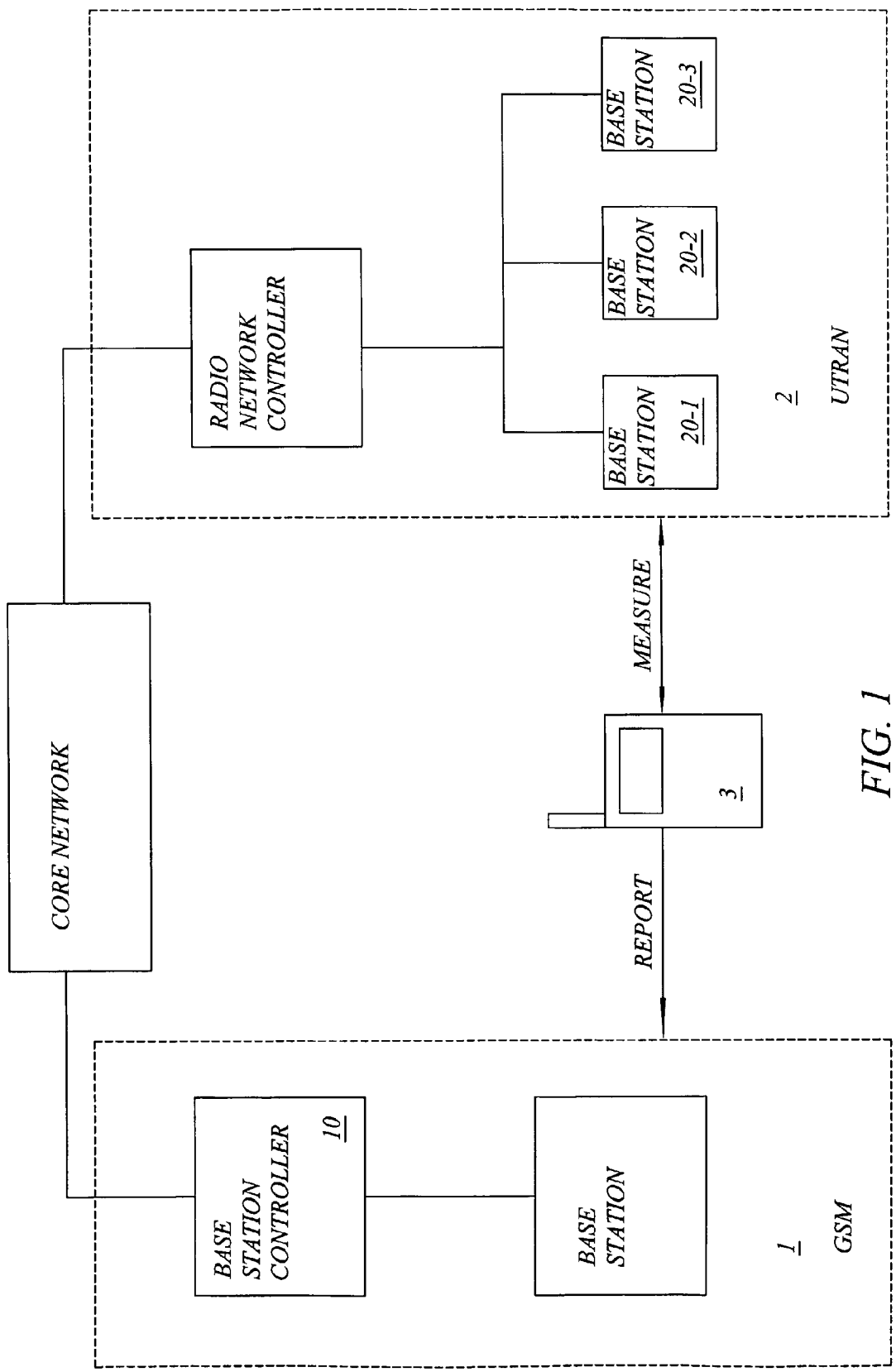
FIG. 1 is a schematic block diagram of a communication system in which an example embodiment can be utilized.

Referring to FIG. 1, consider a user with a dual-mode mobile terminal 3, also referred to as mobile node, mobile station, wireless unit or user equipment, communicating with over a GSM network 1. At the same time the user equipment 3 measures quality parameters for a plurality of neighboring cells or radio base stations 20 in a UTRAN network 2. The measurements can be performed continuously, or at predetermined time intervals.

According to prior art, an existing dual-mode mobile terminal or user equipment 3 measures and reports only the UTRAN quality measure CPICH Ec/No of neighboring UTRAN cells when communicating in GSM mode. (Ref.

3GPP 04.18.) The existing GSM measurement report is used and the measured CPICH Ec/No value is reported for one or more UTRAN cells.

Figure 2:
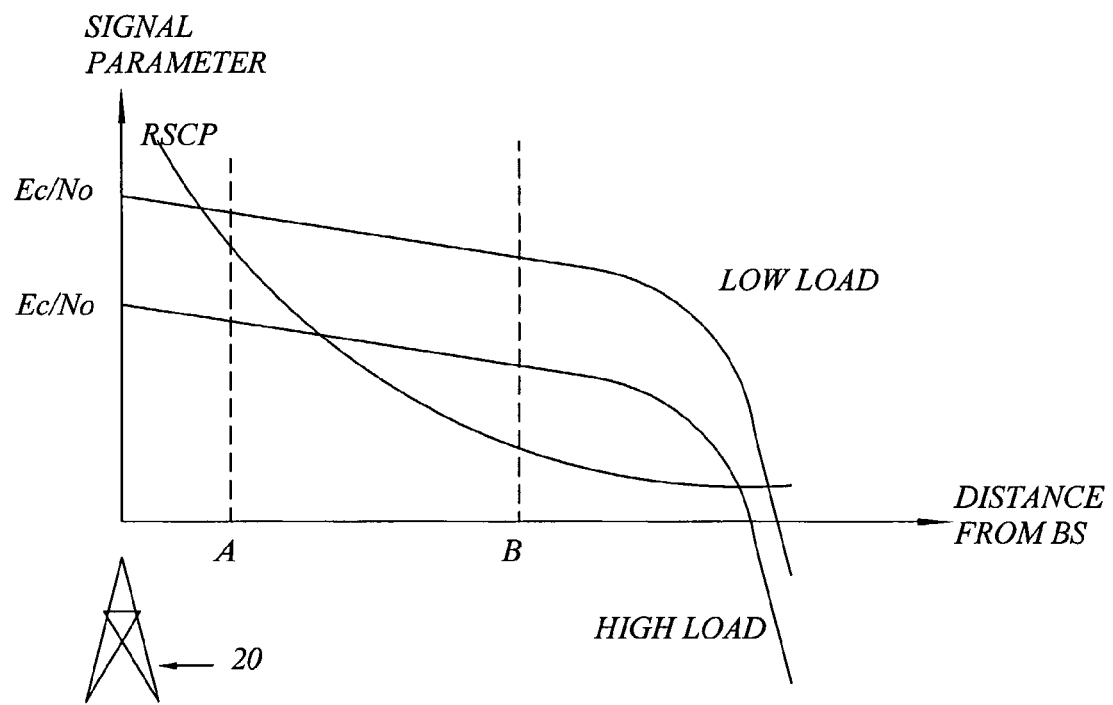
FIG. 2 is a schematic diagram illustrating how RSCP and $E_c$/No varies with the distance from a base station.

Referring to FIG. 2, the present technology is based on the recognition that the existing solution, where the user equipment 3 reports only the Ec/No values, has some important drawbacks. The main problem is that the $E_c$/No and the RSCP values have little or no correlation, but are both important for the quality.

FIG. 2 illustrates schematically how both the Ec/No and the RSCP values vary as functions of the distance from a measured base station. RSCP typically has an exponentially decreasing behavior, more or less independent on the load situation of the base station. The Ec/No decreases slowly until it drops abruptly, resulting in a pronounced knee on the curve. Also, Ec/No is load dependent (since No is a measure of the power density in the band) and as a result the curve is displaced downward when the traffic load increases.

Consequently, both the Ec/No and the RSCP value at a certain geographical location can be very good at a low traffic load in the network, while the same spot may show a quite bad Ec/No value at a higher traffic load (and the RSCP value is still good) (see point A in FIG. 2). Or, the Ec/No may be very good and the RSCP may be bad at low traffic load (see point B in FIG. 2). In especially new UTRAN markets where the traffic load most probably will change quite substantially, this will cause a problem to define an optimal GSM to UTRAN (GTU) handover parameter setting.

Field Trial activities have proven that the above problems exist, and that an optimal GSM to UTRAN handover decision cannot be guaranteed based on only the Ec/No value. This may cause dropped calls due to too low signal strength in downlink or uplink.

In present implementations of UTRAN to GSM, it is also possible to base the handover decision on RSCP values. However, since the GSM to UTRAN decision is based solely on Ec/No this may cause unbalanced handover borders, resulting in so called ping-pong handovers, or unnecessary large hysteresis areas.

In order to overcome the above mentioned problem, and provide a more stable handover for GSM to UTRAN the present technology proposes a solution wherein also the RSCP value is measured and reported to the base station controller of the first radio access network.

Figure 3:
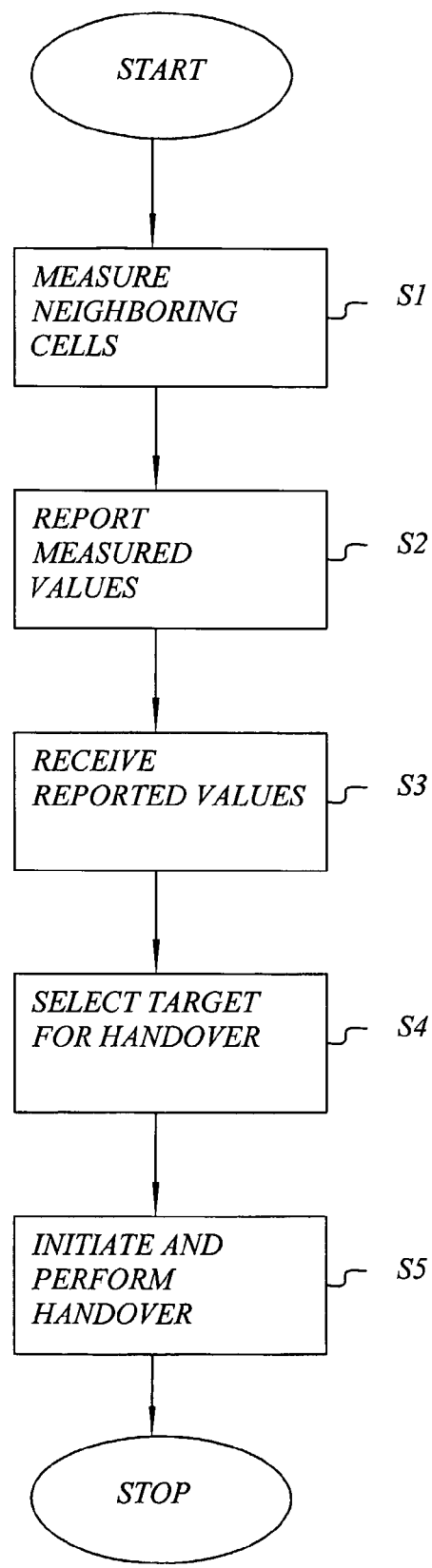
FIG. 3 is a flow diagram of a method according to an example embodiment.

An example embodiment of a method will be described with reference to FIG. 1 and FIG. 3.

According to the example embodiment, the measured first parameter comprises information relating to the quality of the received signal at the user equipment 3. Preferably, the first parameter represents the energy per chip over noise (Ec/No). Also, according to the example embodiment, the second parameter comprises information relating to the strength of the received signal at the user equipment 3. Preferably, the second parameter represents the received signal code power (RSCP).

In a second act S2, the mobile terminal 3 reports the measured first and second parameters for each neighboring UTRAN cell 20 to the GSM base station controller 10. According to a first example embodiment, the mobile terminal 3 reports both parameters for each cell at the same time. According to another example embodiment, the mobile terminal 3 reports the values alternately to the base station controller 10.

In a third act S3; the base station controller 10 receives the measured first and second parameters for each neighboring UTRAN cell 21.

Subsequently, in a fourth act S4, the node or base station 10 or typically the base station controller, based on the received first and second parameters selects which UTRAN cell 20 from the plurality of neighboring UTRAN cells 20 that should be the target cell and consequently receive the handover.

Preferably, the UTRAN cell 20 with the combination of the highest values for both of said two parameters is selected. However, it is understood that some other selection algorithm can be utilized in order to determine the handover.

Consequently, in a fifth act S5, the base station controller 10 initiates the handover to said selected target UTRAN cell 20.

Finally, the handover is completed.

Conventional procedures for handover and synchronization are not part of the invention embodiment, and therefore not described in any detail.

According to another example embodiment of the method, the reporting act S2 is performed by including the measured parameters in a measurement report (as defined by 3GPP-standard), such as the Measurement Report of 3GPP TS 04.18.

The existing Measurement Report message specified in the 3GPP TS 04.18 includes fields for GSM RXQUAL values, or UTRAN/WCDMA Ec/No values. The message can, according to the technology, be modified to include both Ec/No and RSCP, or alternating Ec/No or RSCP values. The RXLEV-NCELL n field (where 'n' is one of the 6 reported neighbors) consists of 6 bits. See Table 1 below.

The Measurement Results is a type 3 information element with 17 octets length.

TABLE 1

| | | | | | | | | |
|---|---|---|---|---|---|---|---|---|
| 8 | 7 | 6 | 5 | 4 | 3 | 2 | 1 | |
| | Measurement Results IEI | | | | | | | octet 1 |
| | BA-USED | DTX USED | RXLEV-FULL-SERVING-CELL | | | | | octet 2 |
| | 3G-BA-USED | MEAS-VALID | RXLEV-SUB-SERVING-CELL | | | | | octet 3 |
| 0 spare | RXQUAL-FULL SERVING-CELL | | | RXQUAL-SUB SERVING-CELL | | | NO-NCELL M (high part) | octet 4 |
| NO-NCELL-M (low part) | RXLEV-NCELL 1 | | | | | | | octet 5 |
| BCCH-FREQ-NCELL 1 | | | | | BSIC-NCELL 1 (high part) | | | octet 6 |
| BSIC-NCELL 1 (low part) | | | RXLEV-NCELL 2 (high part) | | | | | octet 7 |
| RXLEV NCELL 2 (low part) | BCCH-FREQ-NCELL 2 | | | | | BSIC-NCELL 2 (high part) | | octet 8 |

TABLE 1-continued

Measurement report

| 8 | 7 | 6 | 5 | 4 | 3 | 2 | 1 | |
|---|---|---|---|---|---|---|---|---|
| BSIC-NCELL 2 (low part) | | | | RXLEV-NCELL 3 (high part) | | | | octet 9 |
| RXLEV-NCELL 3 (low part) | | BCCH-FREQ-NCELL 3 | | | | | BSIC-NCELL 3 (high part) | octet 10 |
| BSIC-NCELL 3 (low part) | | | | RXLEV-NCELL 4 (high part) | | | | octet 11 |
| RXLEV-NCELL 4 (low part) | | | BCCH-FREQ-NCELL 4 | | | | | octet 12 |
| BSIC-NCELL 4 | | | | | RXLEV-NCELL 5 (high part) | | | octet 13 |
| RXLEV-NCELL 5 (low part) | | | | BCCH-FREQ-NCELL 5 (high part) | | | | octet 14 |
| BCCH-FREQ-NCELL 5 (low part) | BSIC-NCELL 5 | | | | | RXLEV NCELL 6 (high part) | | octet 15 |
| RXLEV-NCELL 6 (low part) | | | | BCCH-FREQ-NCELL 6 (high part) | | | | octet 16 |
| BCCH-FREQ-NCELL 6 (low part) | | BSIC-NCELL 6 | | | | | | octet 17 |

According to one example embodiment, both Ec/No and RSCP values are included in the Measurement Report. The 6 bits (below called B'0-B'5) in the RXLEV-NCELL n field are enough to include both relevant Ec/No values and relevant RSCP values, if a limited value range for each parameter is used.

TABLE 2

RXLEV-NCELL field

| Reported value | Corresponds to Ec/No | Corresponds to RSCP (in ranges with 5 dBm steps) |
|---|---|---|
| B'0-B'5 = 000000-000111 | −14 dB or lower | −110 or lower to −75 dBm or higher |
| B'0-B'5 = 001000-001111 | −13 dB | −110 or lower to −75 dBm or higher |
| B'0-B'5 = 010000-010111 | −12 dB | −110 or lower to −75 dBm or higher |
| B'0-B'5 = 011000-011111 | −11 dB | −110 or lower to −75 dBm or higher |
| B'0-B'5 = 100000-100111 | −10 dB | −110 or lower to −75 dBm or higher |
| B'0-B'5 = 101000-101111 | −9 dB | −110 or lower to −75 dBm or higher |
| B'0-B'5 = 110000-110111 | −8 dB | −110 or lower to −75 dBm or higher |
| B'0-B'5 = 111000-111111 | −7 dB or higher | −110 or lower to −75 dBm or higher |

With this method the 6 bits can report the Ec/No values [−14 dB or lower; −13 dB; −12 dB; −11 dB; −10 dB; −9 dB; −8 dB; −7 dB or higher] and the CPICH RSCP values [−110 dBm or lower; −105 dBm; −100 dBm; −95 dBm; −90 dBm; −85 dBm; −80 dBm; −75 dBm or higher].

As a consequence, each reported value for Ec/No is reported together with one of eight different values or intervals for RSCP.

It is understood that each value is valid for a specific Frequency and Scrambling Code in the UTRAN/WCDMA network.

According to another embodiment of a method, alternating Ec/No and RSCP values are included in the Measurement report.

An alternative to the method is to order the user equipment 3 to report alternating Ec/No and RSCP values. The method of reporting, and reported quantity, can e.g. be indicated by using bits (/spare bits) in the Measurement Result message.

This method could for instance be selected if the impact on the mobile terminal or user equipment implementation in the first method is high. With this method, the base station controller 10 keeps track of the values of both measured parameters, to be able to use both values in the handover evaluation.

Figure 4:
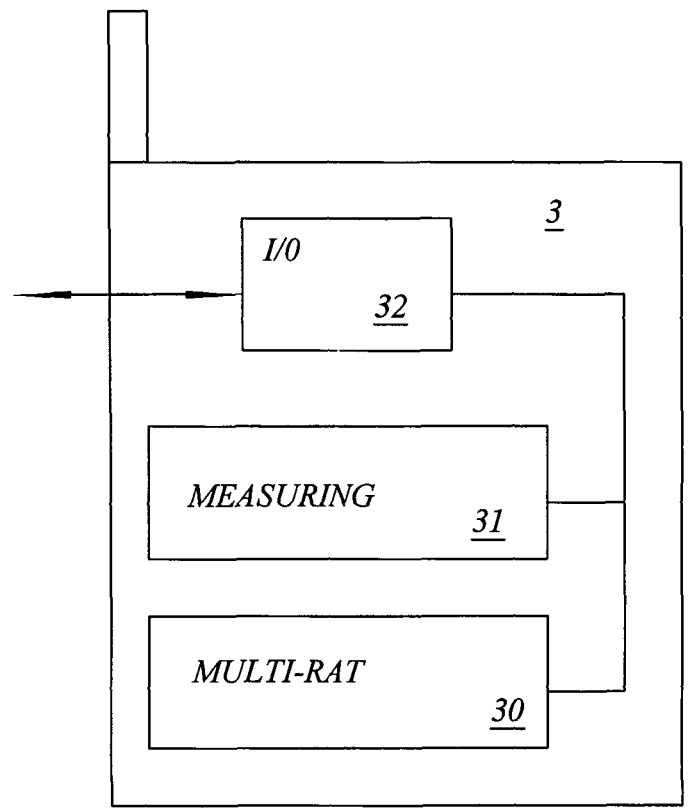
FIG. 4 is a schematic block diagram of an embodiment of a mobile equipment according to an example embodiment.

FIG. 4 illustrates an example embodiment of a user equipment. The user equipment 3 is equipped with multi-RAT capabilities 30, e.g. GSM/TDMA and UTRAN/WCDMA. Further, the user equipment 3 comprises means 31 for measuring first and second (quality) parameters for neighboring UTRAN cells 20, and means 32 for reporting the measured parameters to a node such as a base station or base station controller 10 of a first network 1. In practice, the reporting means 32 are provided as part of an I/O unit.

The reporting means 32, according to a first example embodiment, is adapted to report both parameters at the same time. According to another embodiment of a user equipment 3, the reporting means 32 is adapted to report the first and second parameters alternately.

In a preferred embodiment, the Measurement Result Report contains an indication whether the user equipment 3 can report Ec/No and RSCP simultaneously or alternating. This can, for instance, be implemented through a minor addition to the Classmark Change message specified in the 3GPP TS 04.18 and 24.008.

The implementations of this solution should be able to handle user equipment 3 that are unable to report both Ec/No and RSCP values i.e. backward compatibility has to be considered.

Figure 5:
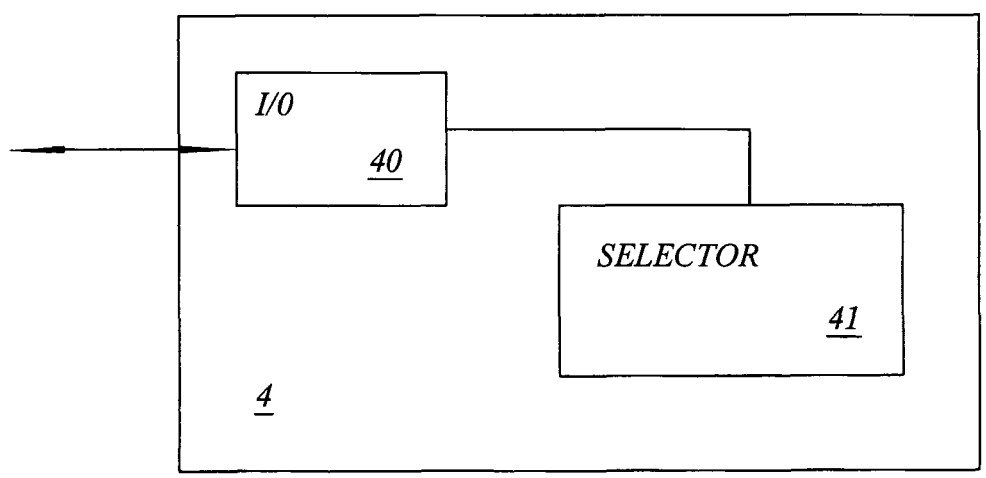
FIG. 5 is a schematic block diagram of an example embodiment of a node in a radio access network.

FIG. 5 illustrates a network node 4 in a first radio access network, e.g. a GSM network. The node 4 comprises means for receiving 40 measured first and second parameters from a multi-RAT user equipment, and means for selecting 41 a target UTRAN cell for potential handover in a UTRAN network. Finally, the node 4 is typically adapted to command the user equipment to switch to the selected target cell.

The receiving means 40, according to a first example embodiment, is adapted for receiving said first and second parameters at the same time.

According to said first example embodiment, the selecting means 41 is adapted for selecting a target cell based on first and second parameters received at the same time. Preferably, said parameters are Ec/No and RSCP for a UTRAN cell.

Typically, the reporting means 40 comprises an I/O unit, which also is adapted to command the handover.

Preferably, the network node 4 is a base station controller or a base station in a GSM network 1.

According to a second example embodiment, the receiving means 40 is adapted for receiving said first and second parameters alternately. Consequently, the selecting means 41 is adapted for selecting a target cell based on alternately received first and second parameters. Preferably, said parameters are Ec/No and RSCP.

A major advantage of this technology is that decisions on handover to UTRAN will be optimized. The decision will be more independent of the traffic load situation, and the implementation can be made in such a way that the operator can select to trigger GSM to UTRAN handover based on Ec/No measurements, RSCP measurements, or both.

The technology has primarily been discussed in the context of a handover of a dual-mode mobile terminal or user equipment from a GSM network to an UTRAN network. However, the technology is equally applicable to handover from any type of network i.e. WLAN, CDMA2000 to a network utilizing WCDMA. Also, it is equally applicable to a multi-mode user equipment.

Since the basic idea of invention is general, it can also be applied in the evaluation of any radio network existing today or in the future.

It will be understood by those skilled in the art that various modifications and changes may be made to the present invention without departure from the scope thereof, which is defined by the appended claims.

The invention claimed is:

1. A method for enabling improved handover of a user equipment communicating in a first radio access network utilizing a first radio access technology (RAT), said method comprising:
   measuring, at said user equipment, a first parameter for a plurality of neighboring cells of at least a second radio access network utilizing WCDMA,
   measuring at least a second parameter for said plurality of cells of said second network;
   reporting said first parameter and second parameter to a node in said first network and
   initiating handover to one of said plurality of cells in said second network based on both of said first and second measured parameters, and wherein
   both the first and the second parameter are reported simultaneously and said first parameter is reported according to one of a limited range of values, and said second parameter is reported in the same field in a Measurement Report message using a limited value range, whereby each first parameter value is reported together with one of a plurality of possible limited value ranges for said second parameter.

2. The method according to claim 1, wherein said first radio access network comprises one of GSM, WLAN and CDMA2000.

3. The method according to claim 2, wherein said node is a base station controller in a GSM radio access network.

4. The method according to claim 1, further comprising reporting said first parameter according to one of the ranges −14 dB or lower, −13 dB, −12 dB, −10 dB, −9 dB, −8 dB, −7 dB or higher, and simultaneously reporting reporting said second parameter according to one of the ranges −110 dBm or lower, −105 dBm, −100 dBm, −95 dBm, −90 dBm, −85 dBm, −80 dBm, −75 dBm or higher.

5. The method according to claim 1, wherein said first parameter comprises information regarding the quality of the received signal at the user equipment.

6. The method according to claim 5, wherein said first parameter representing the chip energy divided by noise, Ec/No.

7. The method according to claim 1, wherein said second parameter comprises information regarding the signal strength of the received signal at the user equipment.

8. The method according to claim 7, wherein said second parameter represents the Received Signal Code Power (RSCP).

9. The method according to claim 1, further comprising initiating handover to said second network based on optimizing a predetermined function depending on said first and second parameter.

10. The method according to claim 1, further comprising initiating handover to a cell of said plurality of cells in said second network with the highest values on both said first and second parameters.

11. A user equipment adapted for communicating with a first radio access network utilizing a first radio access technology or a second radio access network utilizing WCDMA, said user equipment performing measurements of at least one cell in the second network in order to determine a suitable handover cell while communicating over said first radio access network, said user equipment comprising:
   means for measuring a first parameter and means for reporting said parameter to the first radio network;
   means for measuring a second parameter, and
   means for reporting both said measured first and second parameters simultaneously to a node in said first radio access network, wherein said means are configured for reporting said first parameter according to one of a limited range of values, and for reporting said second parameter in the same field in a Measurement Report message using a limited value range, whereby each first parameter value is reported together with one of a plurality of possible limited value ranges for said second parameter.

12. The user equipment according to claim 11, wherein said reporting means is adapted for reporting said first parameter according to one of the ranges −14 dB or lower, −13 dB, −12 dB, −10 dB, −9 dB, −8 dB, −7 dB or higher, and simultaneously reporting said second parameter according to one of the ranges −110 dBm or lower, −105 dBm, −100 dBm, −95 dBm, −90 dBm, −85 dBm, −80 dBm, −75 dBm or higher.

13. The user equipment according to claim 11, wherein said first parameter comprises information regarding the quality of the received signal at the user equipment.

14. The user equipment according to claim 11, wherein said second parameter comprises information regarding the signal strength of received signals at the user equipment.

15. The user equipment according to claim 11, wherein said first parameter is the Ec/No, and said second parameter is the RSCP.

16. A network node in a first radio access network, utilizing a first radio access technology, capable of communicating with a user equipment and receiving measurements of neighboring cells of a second radio access network utilizing WCDMA from the user equipment, the node comprising:
   means for simultaneously receiving measured first and second parameters of the second radio access network from the user equipment, wherein said receiving means are configured for receiving said first parameter according to one of a limited range of values, and for receiving said second parameter in the same field in a Measurement Report message using a limited value range, whereby each first parameter value is received together with one of a plurality of possible limited value ranges for said second parameter, and means for selecting a target cell of said neighboring cells of said second network for handover based on said received first and second parameters.

17. The network node according to claim 16, wherein said receiving means are adapted for receiving said first parameter according to one of the ranges −14 dB or lower, −13 dB, −12 dB, −10 dB, −9 dB, 8 dB, −7 dB or higher, and simultaneously receiving said second parameter according to one of the ranges −110 dBm or lower, −105 dBm, −100 dBm, −95 dBm, −90 dBm, −85 dBm, −80 dBm, −75 dBm or higher.

18. The network node according to claim 16, wherein said first parameter comprises information regarding the quality of received signals at the user equipment.

19. The user equipment according to claim 16, wherein said second parameter comprises information regarding the signal strength of received signals at the user equipment.

20. The network node according to claim 16, wherein said received first and second parameters are the Received Signal Code Power (RSCP) and/or the chip energy divided by noise, Ec/No.

21. The network node according to claim 16, wherein said node comprises a base station controller.

* * * * *